United States Patent [19]

Boekhorst

[11] 3,781,603

[45] Dec. 25, 1973

[54] CIRCUIT ARRANGEMENT FOR GENERATING A MAINLY SAWTOOTH DEFLECTION CURRENT OF LINE FREQUENCY IN A PICTURE DISPLAY APPARATUS

[75] Inventor: Antonius Boekhorst, Emmasingel, Eindhoven, Netherlands

[73] Assignee: U.S. Philips Corporation, New York, N.Y.

[22] Filed: July 8, 1971

[21] Appl. No.: 160,658

[30] Foreign Application Priority Data

July 18, 1970 Netherlands ........................ 7010690

[52] U.S. Cl. ............................................ 315/27 GD

[51] Int. Cl. ............................................ H01j 29/70

[58] Field of Search ...................... 315/27 GD, 24 R, 315/27 R

[56] References Cited

UNITED STATES PATENTS

| | | | |
|---|---|---|---|
| 3,434,004 | 3/1969 | Smeulers et al. | 315/27 TD |
| 3,174,074 | 3/1965 | Massman | 315/27 GD |
| 3,426,243 | 2/1969 | Smeulers et al. | 315/27 GD |
| 3,147,397 | 9/1964 | Michaelson | 315/27 GD |
| 3,452,243 | 6/1969 | Knorr | 315/27 GD |
| 3,320,469 | 5/1967 | Slavik | 315/27 GD |
| 3,447,027 | 5/1969 | Kramer | 315/27 GD |
| 3,543,080 | 11/1970 | Wuensch | 315/27 GD |
| 3,691,422 | 9/1972 | Boekhorst et al. | 315/27 R |

*Primary Examiner*—Leland A. Sebastian
*Assistant Examiner*—J. M. Potenza
*Attorney*—Frank R. Trifari

[57] ABSTRACT

A circuit arrangement for generating an S-corrected sawtooth deflection current of line frequency in a picture display apparatus, the amplitude of which current undergoes a more or less parabolic variation of field frequency for correcting the East-West distortion on the screen of a picture display tube. Two generators, which are substantially decoupled relative to each other, apply a direct voltage to one line deflection coil and the combination of a direct voltage and a field frequency voltage to the other coil. The S-correction is more East-West modulated than the deflection current itself, which is effected by incorporating a capacitor of finite capacitance in the second generator. The circuit arrangement includes a second capacitor of finite capacitance, either in the first generator or in series with the deflection coil.

9 Claims, 5 Drawing Figures

INVENTOR.
ANTONIUS BOEKHORST

BY

AGENT

INVENTOR
ANTONIUS BOEKHORST
BY Frank R. Trifari
AGENT

INVENTOR.
ANTONIUS BOEKHORST
BY Frank R. Trifari
AGENT

CIRCUIT ARRANGEMENT FOR GENERATING A MAINLY SAWTOOTH DEFLECTION CURRENT OF LINE FREQUENCY IN A PICTURE DISPLAY APPARATUS

The invention relates to a circuit arrangement for generating a mainly sawtooth deflection current of line frequency in a picture display apparatus which is provided with a first line deflection current generator for applying at least a part of this current to a line deflection coil, a field deflection generator for applying a current of field frequency to a field deflection coil and a second line deflection current generator current generator for correcting at least the so-called East-West pincushion distortion on the screen of a picture display tube forming part of the picture display apparatus, each line deflection current generator including a line frequency switch with which a supply voltage can be applied across the line deflection coil and being decoupled relative to the other line deflection current generator, the supply voltage associated with the first line deflection current generator being a direct voltage and the supply voltage associated with the second line deflection current generator being the combination of a direct voltage and of a more or less parabolic voltage of field frequency, the arrangement including a capacitor ensuring the so-called S-correction.

Such a circuit arrangement is described in U.S. Pat. No. 3,697,801. In order to eliminate the distortion in the horizontal direction of the picture displayed on the screen of a picture display tube, particularly a colour picture display tube, the so-called East-West pincushion distortion, a generator is employed which is coupled to the line output transformer. This generator can cause the amplitude (= the width of the written line) to vary at the field frequency while the line deflection current generator and the generator for the East-West modulation are decoupled relative to each other. Generally the distorted picture assumes the shape of a pincushion so that the correction must be such that the line deflection current is substantially parabolically modulated during the field scan period, having a maximum value in the centre (= the central horizontal line).

A further correction employed in the line deflection circuit is the so-called S-correction. The purpose thereof is to correct the varying scanning rate on the screen as a result of the non-constant distance from the deflection centre to the rather flat screen and it is generally effected by incorporating a capacitor of finite capacitance in series with the deflection coils. However, in display tubes having a comparatively large deflection angle it has been found that this simple step is not sufficient. It is true that the surface of the screen is formed of spheric parts but these have different radii which gradually merge into each other, while their centre do not coincide. In addition these radii in the horizontal and vertical directions are not equal. The picture displayed can get the substantially rectangular shape of the screen due to the generator for the East-West correction, while the horizontal linearity may be satisfactory in a certain area on the screen, for example, along the central horizontal line due to the S-capacitor, but elsewhere the linearity is less satisfactory. As a result thereof vertical straight lines are displayed crooked. The object of the present invention is to improve the linearity everywhere on the screen of the display tube in case of an East-West corrected horizontal deflection and to this end the circuit arrangement according to the invention is characterized in that the capacitor ensuring the S-correction is constituted by at least two capacitors one of which is arranged in series with the switch in the second line deflection generator.

In order that the invention may be readily carried into effect, some embodiments thereof will now be described in detail, by way of example, with reference to the accompanying diagrammatic drawings, in which.

Figure 3A:
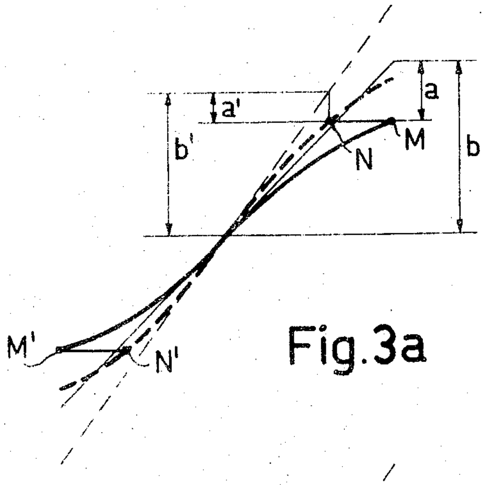
Figure 3B:
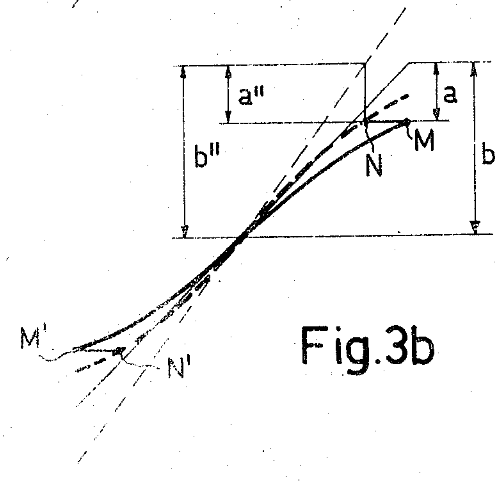
Figure 4:
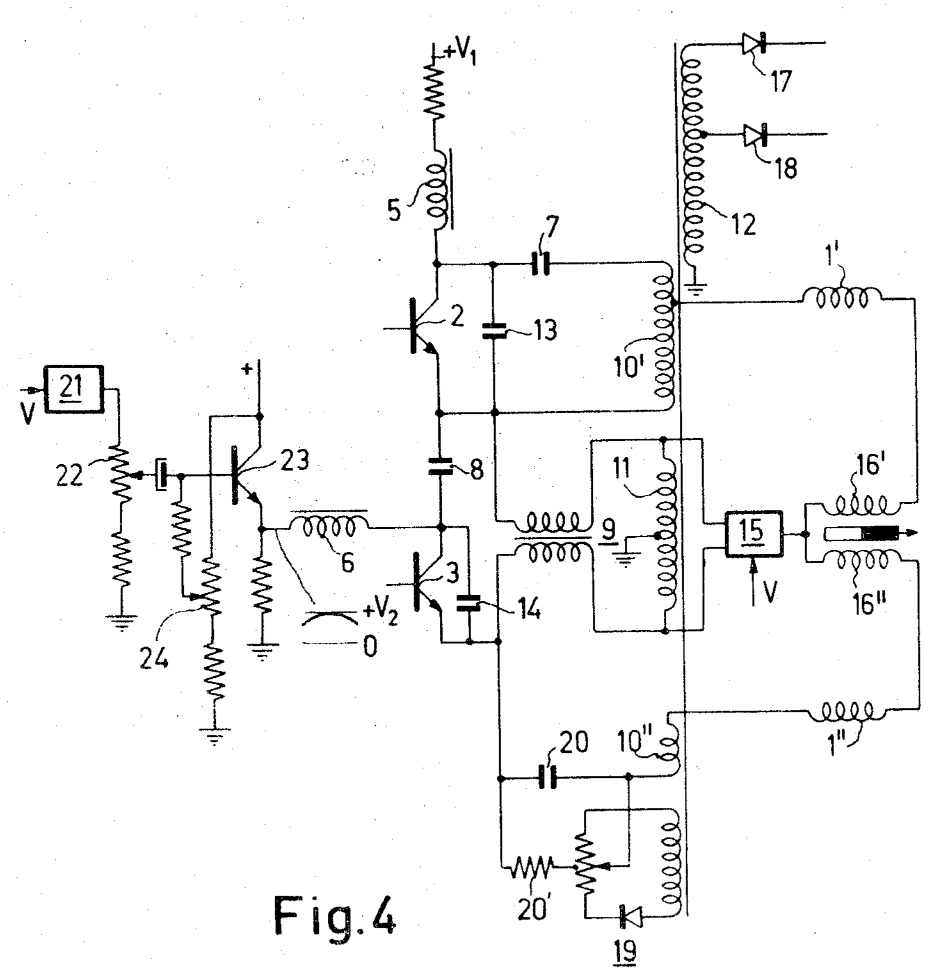

FIGS. 3*a* and 3*b* show the variation of the line deflection current according to the invention in case of a variation of the picture width and FIG. 4 shows a comparatively complete diagram of the generator according to the invention.

Figure 1:
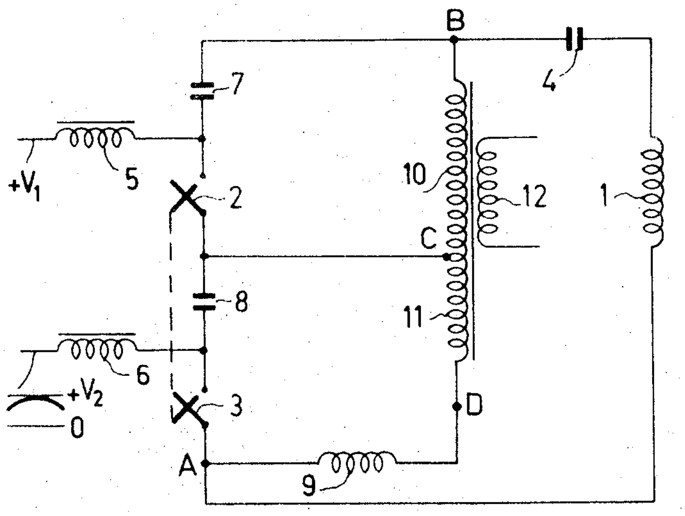
FIG. 1 shows a line deflection current generator according to the invention.

FIG. 1 diagrammatically shows a line deflection generator which applies a line deflection current to a line deflection coil 1. Two switches, 2 and 3, are closed and opened at the line frequency, so that two direct voltages $V_1$ and $V_2$ are applied to coil 1. Consequently a sawtooth current flows through deflection coil 1. In order to effect the S-correction, a capacitor 4 is arranged in series with the deflection coil 1. The capacitance thereof is finite, that is to say, its impedance is not negligibly low for the line frequency. Thus, a substantially parabolic voltage is produced there-across and the current flowing through the deflection coil 1 and S-capacitor 4 therefore includes a third-degree term as a function of time. Furthermore, the generator includes the choke coils 5 and 6 and the isolating capacitors 7 and 8 as shown in FIG. 1, the capacitances of capacitors 7 and 8 being assumed to be infinitely large.

The junction A of switch 3 and deflection coil 1 and the junction B of capacitors 4 and 7 are connected through the primary winding of a transformer and a compensation coil 9, while the said primary winding is split up by a tap C in two windings 10 and 11. Tap C is connected to the junction of capacitor 8 and switch 2. Point D is the junction of winding 11 and the coil 9. During the line flyback period high voltage peaks are produced across the secondary winding 12 of the transformer, with which the EHT for the acceleration anode of the display tube is generated after rectification.

Figure 2:
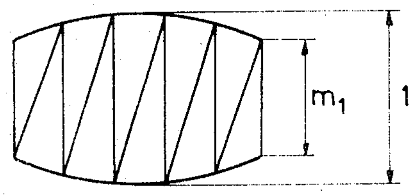
FIG. 2 shows the East-West modulation of the line deflection current.

Part of the deflection energy in the described generator is supplied by switch 2 and voltage $V_1$, the main generator, while the other part of the deflection energy is supplied by a switch 3 and voltage $V_2$, the auxiliary generator. The East-West correction of the pincushion distortion is established in that a more or less parabolic voltage of field frequency is superimposed on the direct voltage supplied by the auxiliary generator. The auxiliary generator thus supplies a parabolic voltage of field frequency having a maximum value referred to as $V_2$ in the middle of the field scan period and two equal minimum values at the commencement and at the end of this period. As a result the deflection current flowing through coil 1 is modulated as is shown in FIG. 2 in which for the sake of simplicity, the field includes only several lines and the S-correction has been left out of consideration. In order that the EHT does not undergo the same modulation, compensation coil 9 is provided in the circuit arrangement while the inductors $L_1$ and $L_9$ of coils 1 and 9, respectively and the number of turns $n_{10}$ and $n_{11}$ of windings 10 and 11, respectively, satisfy the relation $$L_9/L_1 = n_{11}/n_{10}$$

In this manner the bridge circuit ABCD is balanced, that is to say, the auxiliary generator which is connected between points A and C does not produce a voltage between points B and D. This voltage as well as the EHT is therefore free from modulation. By rendering the maximum voltage $V_2$ adjustable it is possible to adjust the width of the displayed picture in a simple manner without the EHT being varied thereby.

The ratio between the maximum and minimum values of the peak-to-peak value of the line deflection current through coil 1 is equal to $1 : m_1$ (see FIG. 2). Since the sawtooth current through a coil is determined by the square-wave voltage applied thereacross, this is also the ratio between the maximum and minimum applied square-wave voltages which occur in the middle and at the end of the field scan period. The ratio $m_1$ is given by the geometrical properties of the display tube and by the properties of the field generated by the deflection unit. If $V_2$ and $p_2V_2$ are referred to as the maximum and the minimum values of the voltage which is supplied during the field scan period by the auxiliary generator, the following relation applies at the end of the field scan period:

$$V_1 + p_2V_2 = m_1(V_1+V_2)$$

If $k$ is the ratio of the maximum voltages supplied by the two generators, that is to say, $V_1 = kV_2$, the result is:

$$p_2 = m_1(1+k) - k = m_1-k\ (1-m_1) \tag{1}$$

This relation shows that $p_2V_2$, hence the modulation depth of the auxiliary generator, is fixed for a given display tube (= for a given $m_1$), once $k$ has been chosen. It is also found from relation (1) that $p_2$ is always smaller than $m_1$ when $m_1 < 1$ as in the case of the pincushion distortion. This means that the auxiliary generator must be modulated deeper than the deflection current. In addition $p_2 = 1$ for $m_1 = 1$ for each value of $k$ (no modulation). It may be noted that $p_2$ is zero when the auxiliary generator only ensures the East-West correction.

The invention is based on the recognition of the fact that the horizontal linearity throughout the screen can be improved if the S-correction is more East-West modulated than the deflection current itself, that is to say, if the third-degree term in the relation for the line deflection current undergoes a deeper field frequency modulation than the linear term. According to the invention this is possible if capacitor 8 in FIG. 1 does not have an infinitely large capacitance as has been assumed so far, but when its capacitance $C_8$ is small enough in order that a more or less parabolic voltage of line frequency is produced thereacross, which is substantially parabolically modulated at the field frequency. To this end this voltage must have a maximum $Vp_2$ in the middle and a minimum $p_2V_{p2}$ at the commencement and at the end of the field scan period. The value $p_2$ used for the derivation of relation (1) is the same as for the voltage $p2V_2$ which is caused by the fact that the parabolic voltage modulating the voltage $V_2$ ensures both the modulation of the first term (sawtooth current) and of the third-degree term (S-shaped current). When at these instants the ratio between the maximum and the minimum values of the amplitude of the substantially parabolic voltage of line frequency prevailing across capacitor 4 must be equal to $(V_{p1} + V_{p2})$: $m_2(V_{p1} + V_{p2})$, in which $m_2$ as well as $m_1$ is given by the geometrical properties of the display tube and by the deflection field, the following relation applies at the end of the field scan period $$m_1V_{p1} + p_2V_{p2} = m_2(V_{p1} + V_{p2}).$$

In this relation $m_1$ is the ratio between the minimum and maximum values of the envelope of the parabolic voltage $V_{p1}$ of line frequency which would be produced across capacitor 4 if no extra modulation were introduced by capacitor 8. If $q_1 = C_4/C_8$ is the ratio of the capacitances of the capacitors 4 and 8 from which follows that $V_{p2} = q_1V_{p1}$, the result is:

$$q_1 = (m_1 - m_2)/(m_2 - p_2) = (m_1 - m_2)/[m_2 - m_1 + k(1-m_1)] \tag{2}$$

in which relation (1) has been introduced. It is found from relation (2) that $q_1$ is also fixed for a given display tube (= for a given $m_1$ and $m_2$) once $k$ has been chosen.

Particularly when $m_1 = m_2$, that is to say, when the modulation of the S-correction must be uniform to that of the deflection current, $q_1 = 0$. This means that capacitance $C_8$ must be very large.

It may be noted that $q_1$ is a positive number so that the denominator and the numerator in relation (2) must have the same sign. If $m_1$ is larger than $m_2$ there applies that $$m_2 - m_1 + k(1-m_1) > 0$$

which dictates a limit value for ratio $k$:

$$k > (m_1 - m_2)/(1 - m_1) \tag{3}$$

In a practical embodiment in which $m_1 = 0.93$ and $m_2 = 0.80$ we have $$k > (0.93 - 0.80)/0.07 = 13/7 = 1.86.$$

If the ratio $k$ of the maximum voltages supplied by the two generators is smaller than the value expressed in relation (3), the envisaged correction cannot be realized.

If $m_2$ must be more than $m_1$ it is found that relation (2) cannot be satisfied in the case of the pincushion distortion. Therefore the invention is furthermore based on the recognition of the fact that capacitor 7 also has a finite capacitance $C_7$ while capacitor 4 has an infinitely large capacitance, that is to say, it may be omitted. Then it is possible to write:

$$V'_{p1} + p_2V_{p2} = m_2(V'_{p1} + V_{p2})$$

in which $V'_{p1}$ represents the parabolic voltage of line frequency which is produced across capacitor 7. Voltage $V'_{p1}$ is not noticeably modulated at the field frequency under the condition that $n_{11}/n_{10}$ is small which is also the condition for which the presence of capacitors 7 and 8 of finite capacitance does not disturb the balance of the bridge circuit ABCD. If $q_2 = C_7/C_8$ from which follows that $V_{p2} = q_2V'_{p1}$ , then we obtain:

$$q_2 = (1 - m_2)/(m_2 - p_2) = (1 - m_2)/[(m_2 - m_1) + k(1 - m_1)] \quad (4)$$

in which relation (1) has been introduced.

Particularly when the modulation of the S-correction must be uniform to that of the deflection current, $m_1 = m_2$ and $q_2 = 1/k$ : in this case the ratio of the capacitances of capacitor 7 and 8 is inversely equal to that of the voltages supplied by the two generators. It is true that the maximum voltage $V_2$ and thus $k$ are adjustable, but the relative variation thereof is small. In this manner it is possible to use two capacitors for capacitors 7 and 8 of comparatively low capacitance and these are cheaper which may be considered as an advantage.

Since the numerator in relation (4) is positive, the denominator thereof must also be positive. This is always possible if $m_2$ is larger than $m_1$ which could not be realized in the previously described embodiment. On the contrary if $m_1$ is larger than $m_2$, $k$ must be more than the same limit value (3) as in the previous case.

It is evident that a combination of the two embodiments described is possible, so that the three capacitors 4, 7 and 8 have a comparatively low capacitance and the envisaged effect may be achieved.

An additional advantage of the East-West modulation of the S-correction described is the following. As previously mentioned the picture width may be adjusted by adjusting the maximum value $V_2$ of the voltage of the auxiliary generator. FIG. 3*a* shows the deflection current as a function of time when the S-correction and the deflection current are modulated equally. When the voltage applied to deflection coil 1 is increased, the slope of the curve in FIG. 3*a* is increased. The line of the screen written between the points M and M' is now written between the points N and N'. FIG. 3*a* shows that the deflection current has now become too linear because the ratio $a/b$ is replaced by the smaller ratio $a'/b'$. If voltage $V_2$ in the circuit arrangement according to the invention is increased in which $V_2$, as above, is the maximum value of the voltage which is supplied by the auxiliary generator, the amplitude of the parabolic voltage of line frequency generated by capacitor 8 is relatively increased with respect to the total voltage applied to line deflection coil 1. This effect compensates the decrease of the S-correction in FIG. 3*a* which is clearly evident from FIG. 3*b* in which the solid line curve changes over to the broken-line curve. The ratio $a/b$ is then replaced by the substantially equal ratio $a''/b''$ and the linearity therefore remains satisfactory.

FIG. 4 shows an embodiment of the circuit arrangement according to the invention, in which the elements corresponding to those in FIG. 1 have the same reference numerals. Line deflection coil 1 is split up into two series-arranged halves, 1' and 1''. Switches 2 and 3 are formed by means of two transistors which are controlled by pulses of line frequency in a manner not shown in FIG. 4. The capacitors 13 and 14 are connected in parallel with transistors 2 and 3, which capacitors ensure the tuning of the primary winding. Transistors 2 and 3 are then of a type such that their base-collector diodes operate as efficiency diodes as described in U.S. Pat. No. 3,504,224. Circuit 15 is a modulator which controls a correction current modulated at the field frequency in line deflection coils 1' and 1'' for the reason and in the manner as described in U.S. Pat. No. 3,697,801. Due to the presence of modulator 15, the deflection generator must be symmetrical which is the case with windings 10 and 11, compensation coil 9 and the linearity control 16 which is arranged in series with the line deflection coil halves 1' and 1''. A secondary winding 12 of the transformer controls diodes 17 and 18 so that the EHT and the focussing voltage, respectively, are generated for the display tube. Furthermore, the circuit arrangement includes the circuit 19 with which a direct current having an adjustable polarity and intensity is added in known manner to the deflection current and which therefore ensures the horizontal centering of the displayed picture. Capacitor 20 serves for smoothing the centering current and should in principle have a very high capacitance. However, it is possible to choose a low capacitance therefor, so that capacitor 20 also contributes to the S-correction, whereby capacitor 20 is separated from circuit 19 by means of a resistor or a choke 20'.

In FIG. 4 the reference numeral 21 denotes a generator which generates a parabolic voltage of field frequency which is applied through a potentiometer 22 to an emitter follower 23. Generator 21 receives a signal originating from the field deflection generator present in the picture display apparatus. The direct current flowing through the emitter of transistor 23 is adjustable by means of a potentiometer 24, while the said emitter is connected through choke coil 6 to the collector of transistor 3, thus playing the role of the source for the auxiliary generator. The maximum value $V_2$ can be adjusted by means of potentiometer 24 in the middle of the field scan period without varying the shape of the parabola and the minimum value can be adjusted by means of the potentiometer 22 at the beginning and the end of the same period of the voltage supplied by the auxiliary generator.

It may be noted that the circuit arrangement described may be used without any modification in the case when the raster distortion to be corrected is barrel-shaped instead of pincushion-shaped. In fact, for barrel distortion the values $m_1$ and $m_2$ must be higher than one, and similar relations as those mentioned above may be written.

It will be evident that one or both switches of FIG. 1 may be formed by switching elements other than transistors, for example, electron valves. Particularly when the described circuit arrangement is intended for use in a color picture display apparatus the embodiment described employing a bridge circuit is especially important because the generated EHT is substantially not influenced due to the provision of capacitor 8. However, if the circuit arrangement described is intended for monochrome display and hence the constancy of the EHT is of less importance, a different decoupling method may be used between the two generators, for example, a method as described in U.S. Pat. No. 3,697,801 mentioned hereinbefore.

What is claimed is:

1. A circuit for generating a substantially sawtooth deflection current of line frequency in a picture display apparatus, said circuit comprising a first line deflection current generator means for applying at least a part of said current to a line deflection coil, a field deflection generator means for applying a current of field frequency to a field deflection coil, a second line deflection current generator means for correcting at least the East-West pincushion distortion on the screen of a picture display tube forming part of the picture display apparatus, each line deflection current generator including a line frequency switch means for supplying respective voltages across the line deflection coil and being decoupled relative to the other line deflection generator, the supply voltage supplied by said first line deflection current generator comprising a direct voltage and the supply voltage supplied by said second line deflection current generator comprising the combination of a direct voltage and of a substantially parabolic voltage of field frequency, and means coupled to said line deflection coil for providing an S correction current having a greater East-West modulation than said East-West modulation of the total line deflection current.

2. A circuit as claimed in claim 1 wherein said providing means comprises a first capacitor coupled in series with said second line deflection generator switch and a second capacitor coupled to said line deflection coil.

3. A circuit as claimed in claim 2, wherein the second capacitor is coupled in series with the switch in the first line deflection current generator.

4. A circuit as claimed in claim 2, wherein the second capacitor is coupled in series with the line deflection coil.

5. A circuit as claimed in claim 3 wherein the ratio of the capacitance of said first to second capacitor is substantially equal to:

$$(1 - m_2)/[m_2 - m_1 + k\ (1 - m_1)\ ],$$

wherein $k$ equals the ratio of said first generator voltage to the maximum value of said second generator voltage, $m_1$ equals the ratio of a line frequency square wave voltage applied across said line deflection coil at the end of a field scan period to its amplitude at the middle of said field scan period, and $m_2$ equals the ratio of said substantially parabolic line frequency voltage at the end of a field scan period to its amplitude at the middle of said field scan period.

6. A circuit as claimed in claim 4 where in the ratio of the capacitance of said first to second capacitor is substantially equal to:

$$(m_1 - m_2)/[m_2 - m_1 + k\ (1 - m_1)],$$

wherein $k$ equals the ratio of said first generator voltage to the maximum value of said second generator voltage, $m_1$ equals the ratio of a line frequency square wave voltage applied across said line deflection coil at the end of a field scan period to its amplitude at the middle of said field scan period, and $m_2$ equals the ratio of said substantially parabolic line frequency voltage at the end of a field scan period to its amplitude at the middle of said field scan period.

7. A circuit as claimed in claim 5 wherein $m_1$ is larger than $m_2$, and the ratio $k$ must be larger than approximately $(m_1 - m_2)/(1 - m_2)$ .

8. A circuit as claimed in claim 2 further comprising means for generating a centering current comprising a means coupled to said line deflection coil for rectifying line frequency pulses and means for smoothing the rectified pulses comprising one of said S correction capacitors.

9. A circuit as claimed in claim 5 wherein $m_1$ is larger than $m_2$, and the ratio $k$ must be larger than approximately $(m_1 - m_2)/(1 - m_2)$.

* * * * *